Patented July 3, 1923.

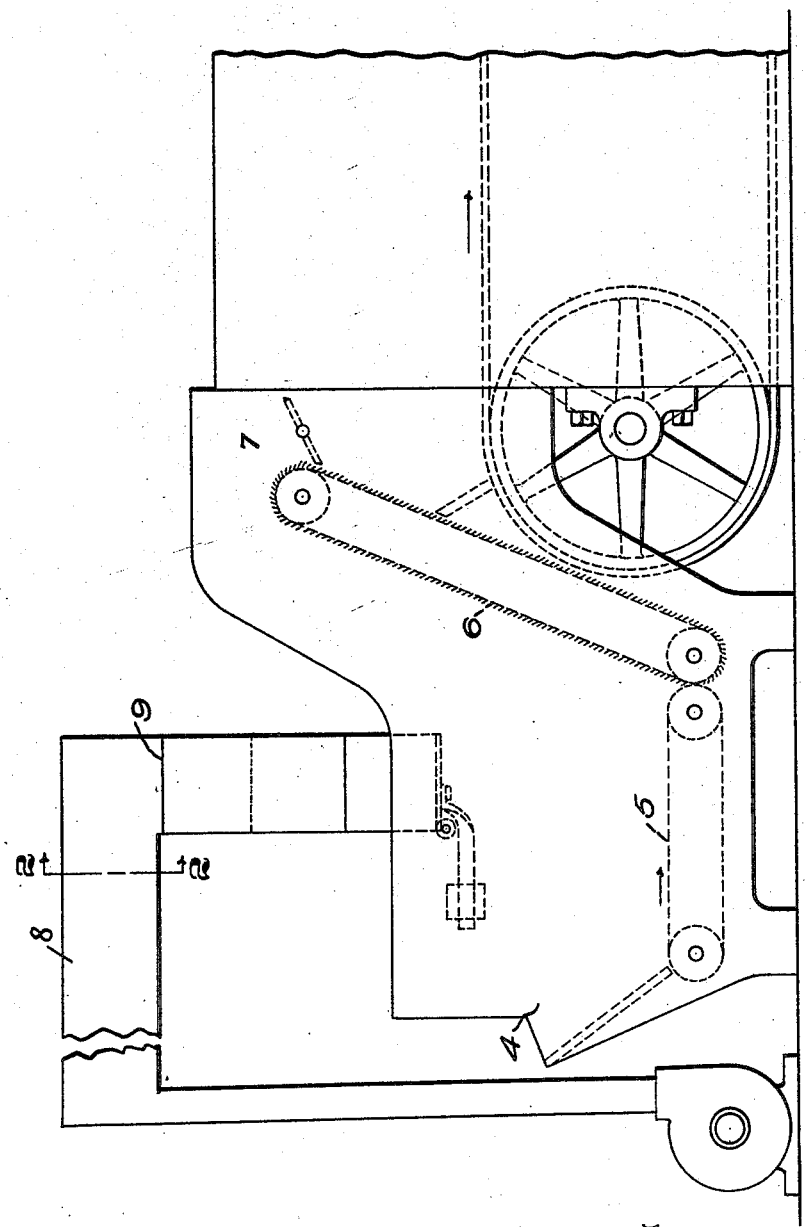

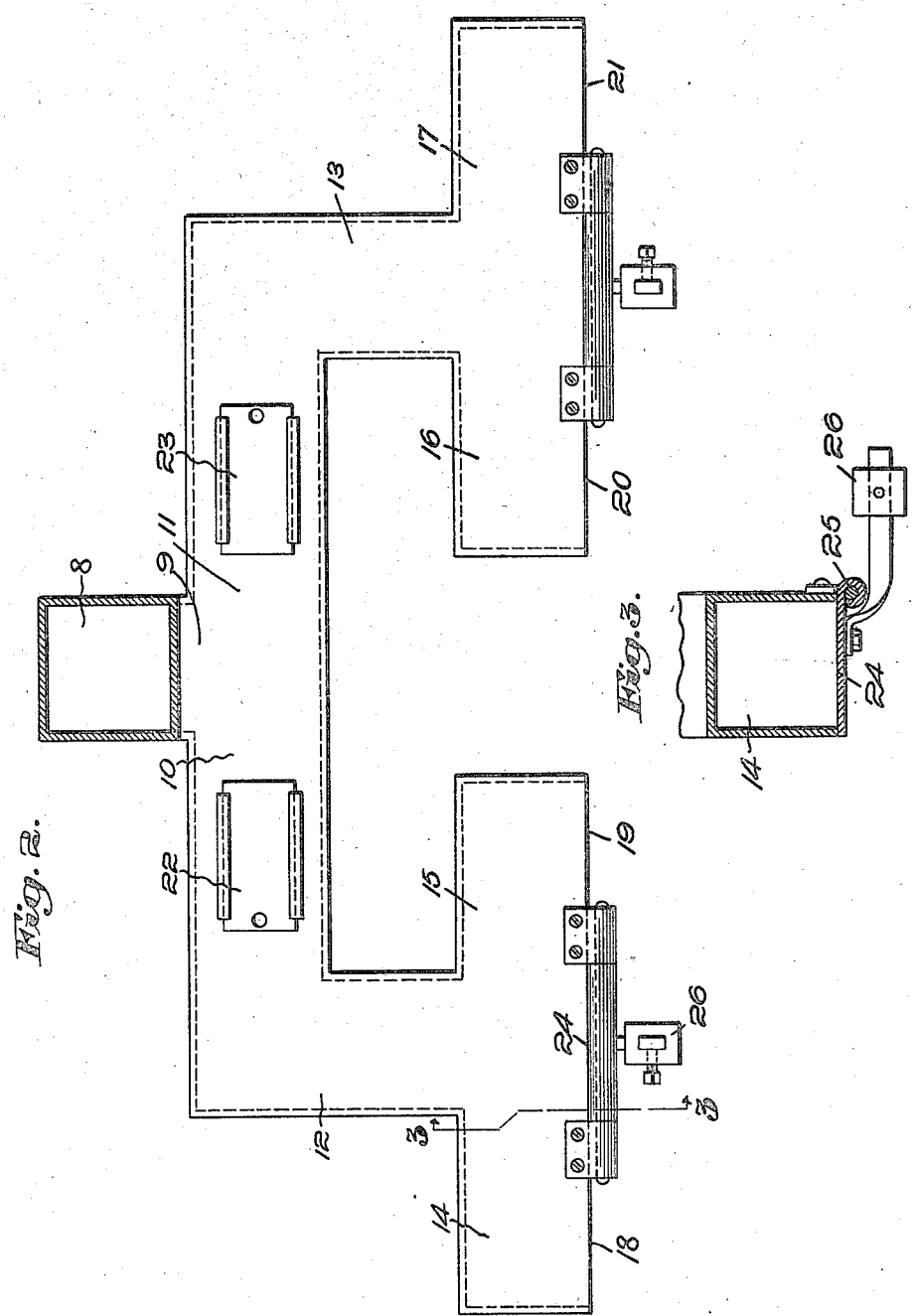

UNITED STATES PATENT OFFICE.

WILLIAM S. KINSLEY, OF READING, MASSACHUSETTS, ASSIGNOR TO THE RUSSELL COMPANY, OF BOSTON, MASSACHUSETTS, A CORPORATION OF MASSACHUSETTS.

MATERIAL-HANDLING APPARATUS.

Application filed January 5, 1920. Serial No. 349,511.

*To all whom it may concern:*

Be it known that I, WILLIAM S. KINSLEY, a citizen of the United States, and a resident of Reading, in the county of Middlesex and State of Massachusetts, have invented an Improvement in Material Handling Apparatus, of which the following description, in connection with the accompanying drawings, is a specification, like characters on the drawings representing like parts.

This invention pertains to improvements in material handling apparatus and methods, and is particularly useful in connection with the handling of fibrous or similar stock in textile mills.

I have elected to disclose a preferred embodiment of my invention as applied to the handling of material as it is fed into a dryer, which may be of usual construction.

Referring to the drawings, which show a preferred form of one illustrative embodiment of my invention:—

Figure 1 is a side elevation of one form of my improved material handling apparatus;

Fig. 2 is an end elevation of a preferred form of discharge distributing system used in connection with the preferred form of my invention, the view being partly in section on the line 2—2 of Fig. 1; and Fig. 3 is a section on the line 3—3 of Fig. 2.

The preferred form of my invention shown in the drawings includes a feeder which may be of the well-known Bramwell type shown in United States patent to Bolette No. 43,959, dated August 23, 1864, having a hopper 4, a conveyor 5 in the bottom thereof, the upper surface of which moves slowly in the direction of the arrow shown in Fig. 1 to convey the material to the apron 6, which may be provided with pins or hooks which catch portions of the material and carry it up the apron to a point where it is removed by a doffer or stripper 7, as is well-known in the art.

The hopper 4 may be of considerable width and, to distribute the material relatively evenly thereacross, as well as to promote even mixing thereof and to prevent to a considerable degree matting together of the material, I supply the material thereto by an air blast through the conduit 8, which preferably terminates in discharge means providing for division of the material a plurality of times, the division being preferably at all points without substantial reduction in area of any division passage as compared with the area of the conduit supplying such passage. Thus in the preferred form of my invention, the conduit 8 turns sharply down at 9 and divides to provide two passages 10 and 11, thereby preferably doubling the area of the space through which the material must pass, the conduits 10 and 11 again turning into conduits 12 and 13, each of which preferably branches into two conduits, the conduits from the passage 12 being numbered 14 and 15 and the conduits from the passage 13 being numbered 16 and 17. Each of the conduits 14, 15, 16 and 17 is provided with a discharge opening numbered 18, 19, 20 and 21 respectively.

It will be understood that the discharge apparatus above described is merely a preferred embodiment of one feature of my invention, which provides a discharge area a plurality of times (herein four times) greater than the area of the initial unitary conduit through which the material first passes. The openings 18, 19, 20 and 21 are preferably, as shown, separated a considerable distance apart so as to distribute the material evenly across the width of the receiving medium, herein shown as the hopper 4.

In the embodiment of my invention shown in the drawings, not only is the material divided into four parts, but the blast of air is divided into four parts, each substantially equal to the area of the initial conduit through which air and material carried thereby pass. Therefore, the blast of air is so divided that it is not sufficiently great at the openings 18, 19, 20 and 21 to disturb substantially the material lying therebelow on the conveyor 5.

In the preferred form of this feature of my invention, the connecting conduits are preferably arranged, at each point of division, so that there will be little if any tendency for the current of air-borne material to be unevenly divided at any dividing point.

I have found it of marked advantage sharply to change the direction of the current of air and the material borne thereby a plurality of times between the unitary conduit and the plural discharge openings.

In the preferred form of my invention, the material changes its direction at 9 at the end thereof, changing again in passing from the opening 9 into the conduits 10 and 11, the direction again being changed in passing from 10 and 11 into 12 and 13, being changed again in passing from the conduit 12 into the conduits 14 and 15 and from the conduit 13 into the conduits 16 and 17, and changing its direction again in passing from the conduits 14, 15, 16 and 17 into the discharge openings 18, 19, 20 and 21 respectively.

My invention is particularly useful in connection with discharge apertures from which wet stock is to be delivered by a current of air. I have found that it is practicable to handle wet stock by a sufficiently strong current of air, but that this can only be done satisfactorily where some form of dividing and retarding apparatus of the general character before described is utilized adjacent the discharge end thereof.

This form of discharge apparatus is also useful in mixing and distributing dry stock, and in connection with the oiling of the stock, all as is more fully described in my co-pending application Serial Number 349,508 filed Jan. 5, 1920.

To permit cleaning of the conduits 10 and 11 and the adjacent conduits, I preferably provide openings having suitable cover plates 22 and 23, and I may and preferably do provide movable walls at the bottom of the conduits 12 and 13, these walls preferably being automatically openable if and when the adjacent conduits become clogged with material. The preferred form of automatically openable wall is best shown in section in Fig. 3, wherein the wall 24 adjacent the conduit 14 is hinged at 25 and normally kept closed by a counterweight 26, being openable when a sufficient weight or material, combined with the air blast, accumulates on the wall 24 to overcome the counterweight 26. It is, of course, obvious that these movable walls may be operated manually, if desired.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. Apparatus adapted to feed wool stock to a feeder of the type used for a carding machine comprising, in combination, a conduit for carrying air blast driven stock, means for forcing a blast of air through said conduit and discharge means for said conduit providing a plurality of discharge openings substantially greater in combined area than the area of a cross-section of said conduit, whereby the stock is distributed in substantially uniform volume from the various openings with a final velocity very materially lower than its velocity through the conduit.

2. Apparatus adapted to feed wool stock to a feeder of the type used for a carding machine, comprising in combination, a conduit for conveying air blast driven stock, means for forcing a current of air through said conduit, discharge means for said conduit having a plurality of discharge openings, and means mounted between two of said openings and movable so that the discharge means near the openings may be kept free of masses of the stock carried by the air blast.

3. Apparatus adapted to feed wool stock to a feeder of the type used for a carding machine, comprising in combination, a conduit for conveying air blast driven stock, means for creating an air blast in said conduit, discharge means for said conduit having a plurality of discharge openings, and an automatically yieldable wall member hinged between two of the discharge openings and in alinement with that part of the discharge means leading directly to the said two openings, whereby an excess of said stock is discharged by outward movement of the wall member.

4. Apparatus adapted to feed wool stock to a feeder of the type used for a carding machine comprising, in combination, a conduit for conveying air blast driven stock, means for forcing a strong current of air through said conduit, and discharge means for said conduit providing a plurality of discharge openings substantially greater in combined area than the area of a cross-section of said conduit, said discharge means providing a plurality of abrupt turns between said conduit and said discharge openings, whereby the stock is discharged from the openings with a velocity materially lower than its velocity through the conduit and in substantially equal volume from each of the openings.

5. Apparatus adapted to feed wool stock to a feeder of the type used for a carding machine comprising, in combination, a conduit for carrying air blast driven stock, means for forcing an air blast through said conduit, and discharge means for said conduit providing a plurality of discharge openings substantially greater in combined area than the area of a cross-section of said conduit, said discharge means including divergent passages connected to said conduit and having abrupt turns therein, said passages being again divided and providing each two divergent secondary passages having connection with separated discharge openings.

6. Apparatus for handling textile stock comprising, in combination, a feeder of the type having a hopper, a travelling conveyor in the bottom thereof, and means for charging said hopper including a conduit for conveying air blast driven stock, said conduit terminating in a plurality of separate discharge openings, whereby the stock is discharged from each opening with a velocity materially lower than its velocity in the conduit so that the stock settles upon the conveyor without any tendency to mat or to disturb the stock already deposited upon the conveyor.

7. Apparatus for handling textile stock comprising, in combination, a feeder of the type having a hopper, a travelling conveyor in the bottom thereof, and means for charging said hopper including a conduit for conveying air blast driven stock, said conduit terminating in a plurality of separate discharge openings, said discharge openings located one relative to the other in a direction extending across the width of said conveyor.

In testimony whereof I have signed my name to this specification.

WILLIAM S. KINSLEY.